May 29, 1934.    F. M. GILSTRAP ET AL    1,960,337
CASING CUTTER AND SPEAR
Filed Dec. 23, 1931
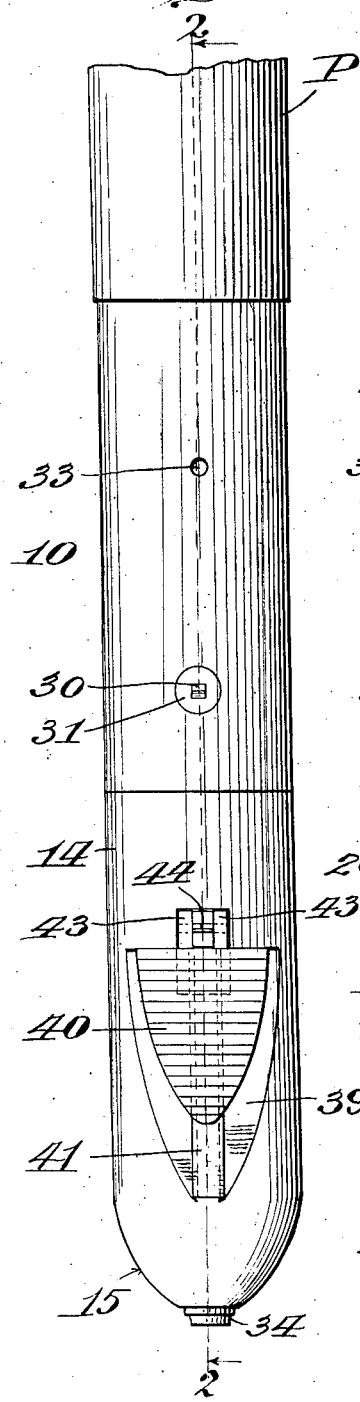
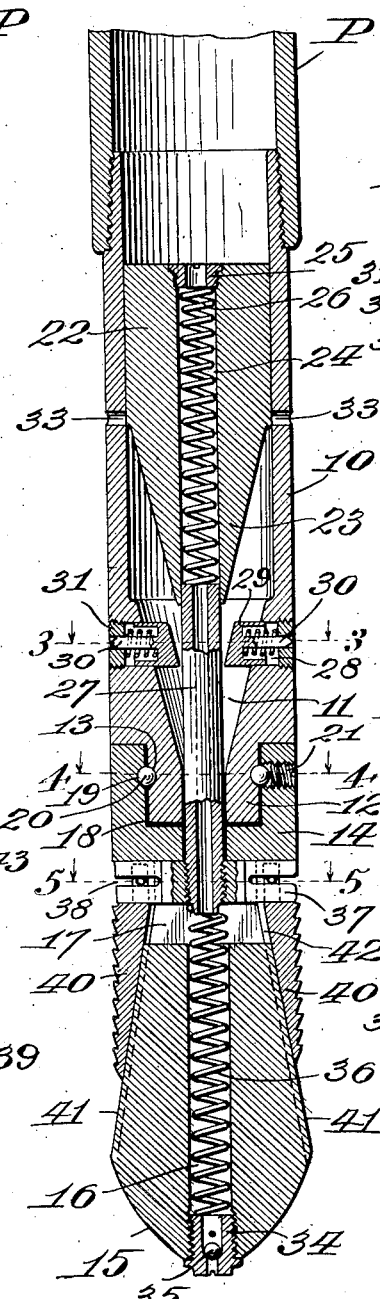
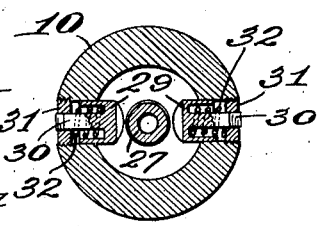
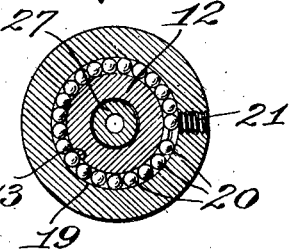
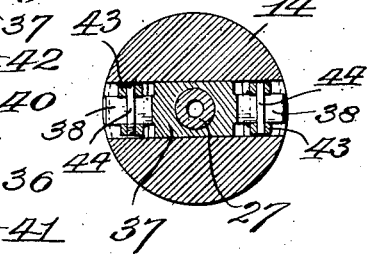
Inventors.
FRANK M. GILSTRAP
AND FRED W. BAURMANN.
By Martin O. Smith
Attorney.

Patented May 29, 1934

1,960,337

UNITED STATES PATENT OFFICE 1,960,337

CASING CUTTER AND SPEAR

Frank M. Gilstrap, Los Angeles, and Fred W. Baurmann, Burbank, Calif.

Application December 23, 1931, Serial No. 582,766

4 Claims. (Cl. 81—195)

Our invention relates generally to oil well tools and more particularly to an inside casing cutter and spear and the principal objects of our invention are, to generally improve upon and simplify the construction of the existing forms of inside casing cutters and further, to provide a hydraulically operated tool that may be advantageously and economically employed for cutting well casing from the interior thereof and for subsequently performing the functions of a spear for engaging and removing the severed section or sections of the casing from the well hole.

Further objects of our invention are, to provide a tool of the character referred to that will greatly minimize the time, labor and consequent expense that is ordinarily involved in casing cutting and removal operations, further, to provide a tool having two main parts, one of which is mounted to freely rotate relative to the other part with one of the parts carrying casing engaging slips, the other part carrying a casing cutter or cutters and which casing engaging slips and cutters are actuated and moved into engagement with the casing by the "mud" or fluid that is caused to circulate through the well by pumps forming a part of the well drilling rig.

With the foregoing and other objects in view, our invention consists in certain novel features of construction and arrangement of parts that will hereinafter be more fully described and claimed and illustrated in the accompanying drawing, in which:

Fig. 1 is a side elevational view of an inside casing cutter and spear constructed in accordance with our invention.

Fig. 2 is a vertical transverse section taken on the line 2—2 of Fig. 1.

Fig. 3 is a horizontal section taken on the line 3—3 of Fig. 2.

Fig. 4 is a horizontal section taken on the line 4—4 of Fig. 2.

Fig. 5 is a horizontal section taken on the line 5—5 of Fig. 2.

Referring by numerals to the accompanying drawing which illustrates a practical embodiment of our invention, 10 designates the upper member of the body of the tool, which member is in the form of a hollow cylinder externally threaded at its upper end in order that it may be directly connected to the lower end of the drill pipe P or to a suitable coupling that is connected to the drill pipe and the lower portion of the chamber within this member 10 tapers downwardly as designated by 11.

Depending from the lower end of body 10 is a short cylindrical member 12 and formed in the periphery thereof is a circumferential ball race 13.

The lower member 14 of the body comprises a cylindrical member having a conical lower end 15 and formed through said member 14 is an axial bore 16 that communicates with a transversely disposed opening 17 that is formed through the member 14 a short distance below its upper end.

The upper portion of body member 14 is provided with a recess 18 for the accommodation of the depending member 12 and formed in the inner face of this chamber 18 is a ball race 19 which, when member 12 is inserted in the recess 18, coincides with the ball race 13.

When the parts are assembled, a plurality of balls 20 occupy the races 13 and 19, which balls are inserted through an aperture in body member 14 and said aperture being closed by a plug 21.

The construction just described holds the body members 10 and 14 in assembled relation and provides an anti-friction bearing between the two members so that one may rotate freely without undue friction relative to the other. In some instances it may be found desirable to lengthen the cylindrical member 12 and the recess 18 that receives said member and to provide two sets of the balls 20 and the races therefor.

Arranged to slide freely within the chamber in body member 10, is a mandrel 22 having a tapered lower portion 23, and formed through said mandrel is an axial bore 24.

Removably seated in the upper end of the bore 24 is a ring shaped plug 25, against which bears the upper end of an expansive coil spring 26 that occupies the bore 24 and the lower end of this spring bears on the upper end of a tubular stem 27 and which latter extends downwardly through the lower end of body 10 and into the upper portion of the bore 16 in lower body member 14.

Formed through the lower portion of the wall of body member 10, are openings 28 and arranged for horizontal sliding movement therein are blocks 29 provided with inclined inner faces and projecting outwardly from these blocks are cutters 30, having sharpened or pointed outer ends. These cutters are arranged to slide through apertures that are formed in the centers of screw plugs 31, which latter are seated in the outer portions of the openings 28.

Interposed between the blocks 29 and plugs 31 are expansive coil springs 32 that normally force the blocks 29 inwardly so that the outer ends of the cutters 30 are flush with or below the outer faces of the plugs 31.

Formed through the wall of body 10 and preferably in the same horizontal plane that is occupied by the upper end of the tapered portion 23 of the mandrel, are one or more ports such as 33.

Removably seated in the lower end of the axial bore 16 in body 14, is a tubular plug 34 provided with an internally arranged seat upon which normally rests an inwardly opening check valve 35, preferably a ball, and this check valve serves to permit "mud" or circulation fluid to pass upwardly, into and through bore 16 and to check the downward flow of the circulation fluid.

Resting on plug 34 is the lower end of an expansive coil spring 36, the upper end of which bears against the lower end of tubular stem 27.

Carried by the lower end of stem 27 and occupying the opening 17, is a transversely disposed bar 37 that functions as a slip hanger and the outer ends of this bar are narrowed in width and provided with horizontally disposed slots 38.

Portions of the outer face of lower body 14 are recessed as designated by 39 for the accommodation of slips 40 having ribbed or corrugated outer faces and the faces of the recesses 39 are inclined and diverge downwardly.

Formed on the central portion of the inclined face of each recess, is a vertically disposed dovetail rib 41 that occupies a corresponding slot 42 that is formed in the rear face of the slip.

Formed integral with and projecting upwardly from each slip 40 is a pair of ears 43 that overlie the sides of the end portion of hanger 37 and seated in said ears is a transversely disposed pin 44 that passes through the slot 38.

In the operation of our improved casing cutter and spear, the same after being adapted to the lower end of the rotary drill pipe, is run into the casing to the point or depth where the cut is to be made and during this operation "mud" or circulating fluid will pass upwardly through the check valve comprising the parts 34 and 35 and thence upwardly through bore 16, tubular stem 27 and bore 24, it being understood that the well casing is filled with the circulating fluid.

When the tool reaches the point where the casing is to be cut, the "mud" pumps are started and when sufficient pressure has been developed on the circulating fluid within the casing, mandrel 22 will be forced downward, thereby compressing spring 26 and the pressure of the latter will force stem 27 downward so as to move slip hanger 37 downward through opening 17 and consequently moving the slips 40 outwardly as the latter move downwardly on the inclined faces of the recesses 39. This downward movement of the stem 27 will compress spring 36.

As the slips 40 are thus moved outwardly they will be forced into gripping engagement with the casing, thus anchoring the tool at the point where the cut is to be made and when the slips have been thus anchored, the pump pressure is eased off and a strain is taken on the drill pipe. Inasmuch as the slips are in clamping engagement with the casing, the strain taken on the drill pipe will cause the same to become perfectly rigid perpendicularly within the casing without tendency to vibrate or wobble.

The pump pressure is now increased so as to force mandrel 22 downwardly until the tapered lower portion 23 thereof engages the inclined inner faces of blocks 29 to move the same outwardly and thereby moving the points of the cutters 30 into engagement with the inner surface of the casing.

The drill pipe with the cutter attached is now rotated with constantly increasing pressure and the rotating cutters will in a short time cut through the wall of the casing.

When the cutters have cut entirely through the casing, the upper end of the mandrel 22 will have passed below the ports 33, thereby permitting the circulating fluid to pass through said ports with the results that the pump pressure will drop and such action will inform the attendants of the drilling rig and pump at the top of the well that the cutting of the casing has been completed.

The pumps are now shut down and the strain on the drill pipe eased off so as to permit the slips to disengage from the casing and move inwardly and upwardly on body member 14 as a result of the expansive action of spring 36.

The drill pipe is now elevated to a point above the cut in the casing and the pumps are again started or the pump pressure increased so as to act upon mandrel 22 and stem 27 to cause the slips 40 to engage that portion of the pipe that has been cut off and the drill pipe, tool and engaged cut portion of the casing may be raised to the top of the well after the manner of raising the casing with an ordinary spear.

In the operation of the now generally used types of cutters, it is necessary to pull all of the drill pipe out of the hole and then run the same in again with a spear to "fish" out the section of casing that has been cut off, but with our combined casing, cutter and spear it is only necessary to make one insertion of the drill pipe and tool and one withdrawal thereof for each cut made in the casing.

Further, with all casing cutters now in general use, it frequently occurs that after the spear has been run in the hole the driller discovers that more casing has been cut off than can be pulled from the hole due to the cut section of casing being "frozen" or imbedded in the formation and under such conditions it is necessary to pull the spear and rerun the cutter to cut off a shorter section of the casing and then rerun and withdraw the spear.

Where our improved tool is used it is possible to cut off and bring to the surface a certain length of casing for each run made and the length of the section of casing to be cut is determined by the degree to which the casing is "frozen" or imbedded in the formation. Without withdrawing the tool from the hole, said tool may be reset and a number of different cuts made until a section is cut that can be readily withdrawn.

While we have shown our improved casing cutter and spear as having two cutters and two slips, it is obvious that an operative tool may be provided with a greater number of cutters and slips and further, that two or more sets of ball bearings such as 20 may be arranged between the upper and lower body members of the tool.

Thus it will be seen that we have provided a combined inside casing cutter and spear that is relatively simple in construction, inexpensive of manufacture and very effective in performing the functions for which it is intended.

An especially desirable feature of our invention is the arrangement and construction whereby hydraulic pressure is utilized for moving the cutters into engagement with the casing and also for moving the slips into gripping engagement with the casing during the cutting operation and likewise for moving said slips into engagement with the cut section of the casing when the same is removed from the well.

It will be understood that minor changes in the size, form and construction of the various parts of our improved casing cutter and spear may be made and substituted for those herein shown and described without departing from the spirit of our invention, the scope of which is set forth in the appended claims.

We claim as our invention:

1. In an inside casing cutter and spear, a body comprising a lower member, an upper member mounted for rotation on the lower member, casing engaging means mounted for operation on the lower member, a projectable cutter arranged for operation in the upper member, a fluid pressure actuated mandrel arranged for movement in a chamber within the upper member and adapted when moved downward to engage and move the projectable cutter outwardly there being a circulation port formed in the wall of the upper member and positioned so as to be uncovered and open when the mandrel is at its lower limit of movement and means actuated by the downward movement of the mandrel for actuating the casing engaging means on the lower member.

2. In an inside casing cutter and spear, a body comprising a lower member, an upper member mounted for rotation on said lower member, casing engaging means mounted for operation on the lower member, a projectable cutter arranged for operation in the upper member, a fluid pressure actuated mandrel arranged for movement in a chamber within the upper member and adapted, when moved downward, to engage and move the projectable cutter outwardly, there being a relief port formed in the wall of the upper member and positioned so as to be uncovered when the mandrel is moved downward to a predetermined position within the chamber in said upper member and a member arranged for sliding movement through the lower portion of the upper member and through the upper portion of the lower member for actuating the casing engaging means as a result of downward movement of said mandrel.

3. An inside casing cutter and spear, as set forth in claim 2 and with yielding pressure means arranged in said mandrel and said lower member for engaging the ends of said sliding member.

4. An inside casing cutter and spear, as set forth in claim 2 and with an inlet check valve located in the lower portion of said lower member.

FRANK M. GILSTRAP.
FRED W. BAURMANN.